May 9, 1967  C. K. SMITH  3,318,584
CONCRETE MIXER AND CONVEYOR
Filed Aug. 24, 1965  3 Sheets-Sheet 2
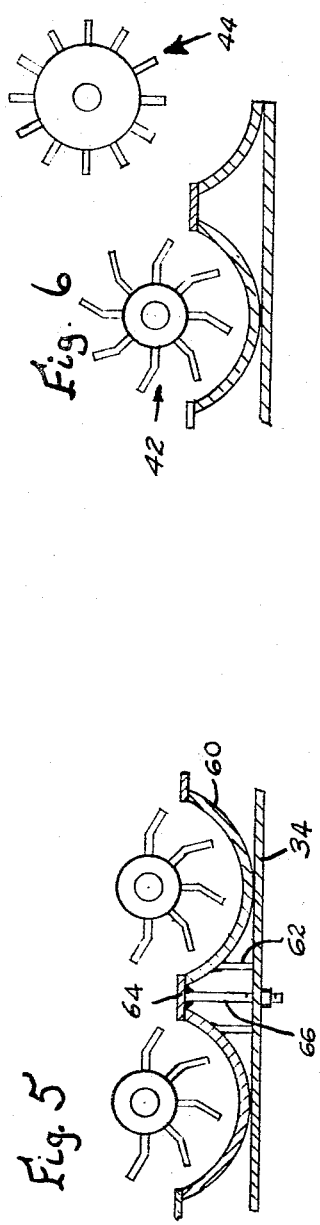
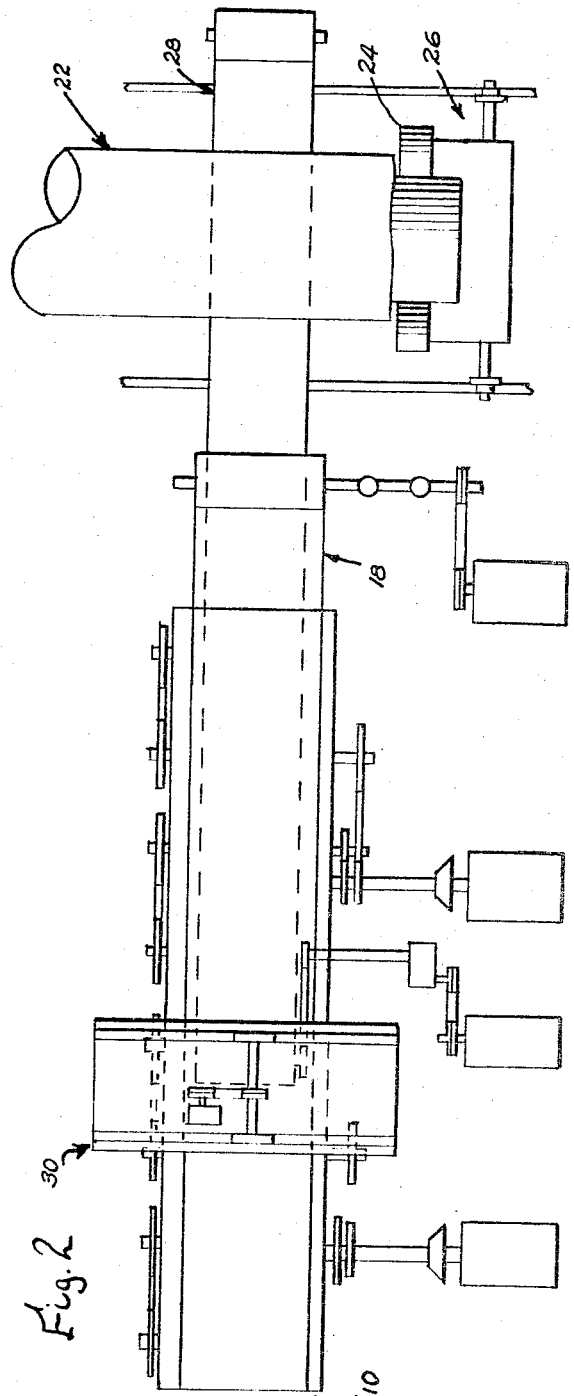

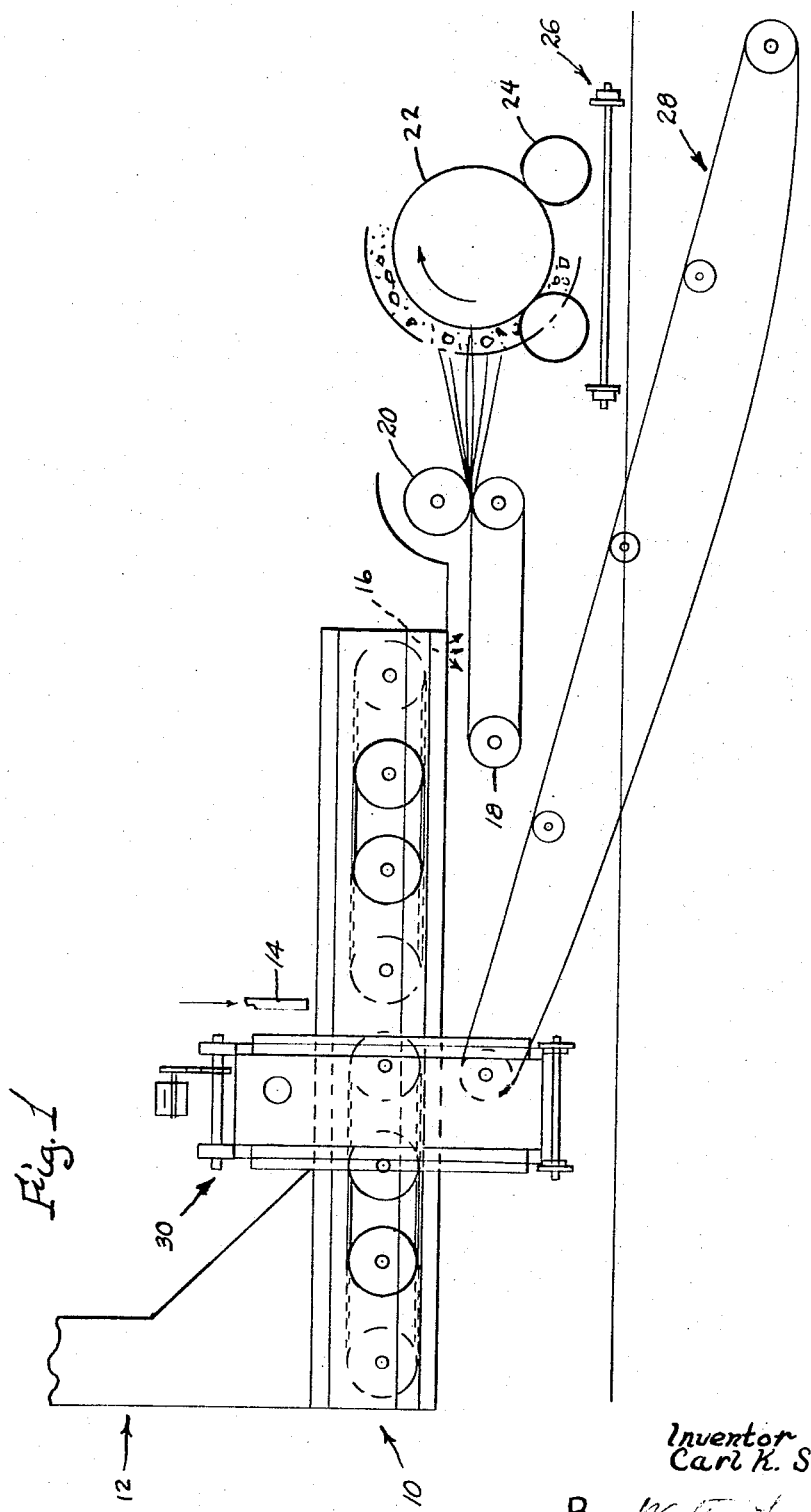

May 9, 1967   C. K. SMITH   3,318,584
CONCRETE MIXER AND CONVEYOR
Filed Aug. 24, 1965   3 Sheets-Sheet 3
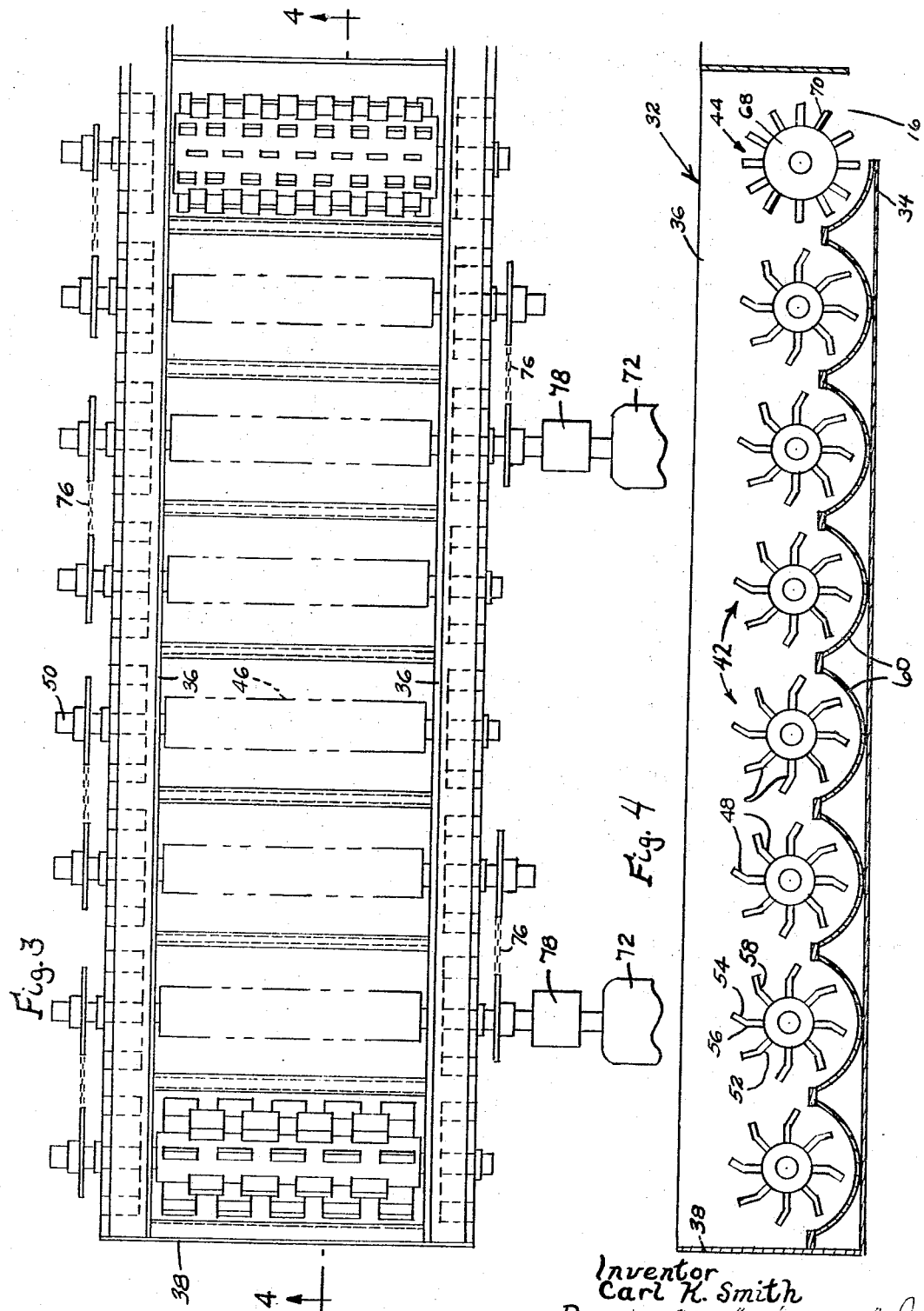

United States Patent Office 3,318,584
Patented May 9, 1967

3,318,584
CONCRETE MIXER AND CONVEYOR
Carl K. Smith, Mathis, Tex., assignor to Amsted Industries Incorporated, Chicago, Ill., a corporation of New Jersey
Filed Aug. 24, 1965, Ser. No. 482,047
13 Claims. (Cl. 259—162)

The present invention relates to a concrete mixer and conveyor.

One of the uses to which the apparatus of the invention is particularly adaptable is in connection with coating pipes with concrete. However, the invention is not limited to such application.

The invention in its broad aspects is directed to means for mixing materials such as the materials making up concrete, e.g., aggregate, cement and water, but the apparatus is also adaptable to mixing materials of almost any character, particularly dry materials. When the apparatus is applied to coating pipe with concrete, the materials making up the concrete are introduced in substantially dry form into the apparatus and the apparatus mixes the materials into a homogeneous mass and transports or conveys them through the apparatus to and through a discharge opening, and at a certain point along the line of conveyance, water is introduced into the mixture for completing the concrete.

A broad object of the invention is to provide a mixing apparatus of the foregoing general character having an unusually large capacity.

Another broad object is to provide a mixing apparatus capable of performing a better mixing operation than has been possible heretofore.

Another object of the invention is to provide an apparatus of the character disclosed having novel construction facilitating replacement of worn parts which is a distinct advantage in view of the rapid deterioration of the parts because of the highly abrasive character of the concrete.

A further object is to provide concrete mixing apparatus, or pug mill, having novel construction resulting in a relatively high degree of floating of the materials as contrasted with forcing the materials against friction in a conveyance apparatus, thereby minimizing the power needs for mixing and conveying functions.

A more specific object is to provide mixing apparatus of the character just referred to, having a plurality of paddles together rotatable on axes transverse to the direction of conveyance of the materials, which results in greater efficiency of the apparatus as contrasted with the kind of apparatus heretofore known such as the auger type device or similar devices rotating on an axis in the direction of the conveyance of the materials.

Other objects and advantages of the invention will appear from the following detailed description taken in conjunction with the drawings wherein—

FIGURE 1 is a side elevational view, partially schematic, showing the mixing apparatus of the invention in conjunction with other apparatus utilized for coating pipe with concrete;

FIGURE 2 is a top view of the apparatus shown in FIGURE 1;

FIGURE 3 is a large scale plan view of the mixing apparatus of the invention;

FIGURE 4 is a sectional view taken at line 4—4 of FIGURE 3;

FIGURE 5 is a fragmentary sectional view oriented according to FIGURE 3 showing certain details of anchoring the troughs in the mixing apparatus in place; and FIGURE 6 is a fragmentary view oriented according to FIGURE 4, showing a modified form of the apparatus.

Referring now in detail to the drawings attention is directed first to FIGURES 1 and 2 showing apparatus for mixing concrete and applying it to the pipe. The apparatus of these figures includes a mixing and conveyor unit identified in its entirety at 10 including the novel features of the present invention and described in detail hereinbelow. In the total apparatus for applying concrete to pipe, the unit 10 is provided with an inlet device 12 through which the dry raw materials for forming the concrete are introduced, namely the aggregate and the cement. These two materials while normally introduced together, are not at that time mixed, at least sufficiently to form concrete.

These materials are so introduced in dry form and later water is introduced at a suitable station as indicated by a conduit 14. The concrete formed by the materials thus mixed and watered, is delivered through a delivery opening 16 to a belt conveyor 18 of known kind. This belt may be operated at a linear speed of in the neighborhood of approximately 5300 feet per minute. A high-speed brush 20, the perimeter of which may move at approximately the same speed as the belt, is provided for cooperating with the belt and spraying the concrete onto the pipe 22. The pipe is carried by a carriage indicated at its entirety 26, of known kind and including means 24 for rotating the pipe. As the pipe is rotated, the concrete is sprayed thereon and the carriage moves along in the direction of the axis of the pipe, the operation continuing until the pipe is coated to the desired thickness. Such a concrete coating on the pipe provides negative buoyancy for use of the pipe under water, in swamps, etc., as for conveying gases. A return conveyor 28 of suitable kind is provided with one end under the pipe for catching any concrete accidentally dropped, and carrying it upwardly to a ring elevator 30 of known kind which returns it to the unit 10.

Referring particularly to FIGURES 3 and 4, the unit 10 includes a main box-like receptacle or member 32 having a bottom element 34 and side walls 36. The member also includes an end wall 38 at its inlet end, or left end as viewed in FIGURES 3 and 4, and an end wall or baffle at its discharge end. The end wall 30 is spaced longitudinally beyond the end of the bottom element 34 forming a discharge opening or aperture 16 referred to above, through which the concrete is delivered onto the conveyor 18.

The mixing unit 10 includes a plurality of paddle cylinders or paddle shaft assemblies 42 arranged on transverse axes. In the present instance there are eight such cylinders, each mounted in place on stub shafts 50 journaled in the side walls 36 and supported by other structural elements of the units as desired. These stub shafts are readily removable from the shafts 46 whereby to facilitate removal of the latter shafts for replacement, which is required at relatively frequent intervals because of the highly abrasive character of the materials making up concrete. For removal, the stub shafts 50 are withdrawn from the shafts 46 and the latter, with the paddles, are lifted out. Suitable elements such as rings, keys, etc., may be used for retaining the stub shafts in position.

The paddles 48 are secured in place in any suitable manner preferably by welding to the shaft 46. Each paddle may be straight but is preferably of bent, "dog leg" shape having an inner portion 52 which is substantially in radial position and an outer portion 54 in the neighborhood of a 20° angle to the inner portion. Each paddle thus has a "knee" 56 and a concave side 58.

The paddles are arranged in axial rows, for example eight such rows and those of adjacent rows are staggered circumferentially, those in each row being aligned with spaces in adjacent rows. It will be noted that the paddle cylinder extends substantially the full width of the receptacle, i.e., between the side walls 36.

Each paddle cylinder 42 is partially disposed in a concentric cylindrical trough 60 of slightly greater radius than the paddle cylinder, these troughs resting on the bottom element 34 and being provided with stabilizing members or feet 62 as shown best in FIGURE 5. Caps 64 are placed on adjacent edges of adjacent troughs, and provided with bolt elements 66 extending through the bottom element 34 where nuts are provided for securing the troughs in place. The troughs 60, as well as the caps 64 are individually and quickly removable for replacement thereof as is quite frequently required because of the rapid deterioration by the abrasive materials making up the concrete. Preferably the troughs are shallow enough to be entirely below the axes of the paddle cylinders.

The discharge paddle cylinder 44 preferably is of construction different from the paddle cylinders 42, having a shaft 68 and paddles 70 that are of lesser radial extent and straight in radial direction. This discharge paddle cylinder has approximately double the number of rows of paddles as cylinder 42 and rotates at a slightly higher speed, and is utilized primarily for discharging the finally mixed concrete through the discharge opening 16, although it does perform a mixing operation and breaks up the impulses normally found in pug mill mixers. This greatly improves smoothness of concrete application.

The paddle cylinders 42 and 44 are rotated by a suitable means which includes for example electric motors 72. These motors operate through drive shafts 74 and may be directly connected with certain ones of the paddle cylinders, while others are driven through drives such as belts 76. In the present instance, the paddle cylinders are arranged in groups of three and four respectively, those of each group being driven by one of the motors. However, it is possible to have all of them driven by one motor, or each driven by a separate motor, or by any combination of such drive elements. The invention includes reversing the direction of rotation of the paddle cylinders and for this purpose a reversing means 78, here indicated diagrammatically, is interposed between each motor and the cylinders driven thereby. The purpose of the reversal will be referred to hereinbelow.

The discharge paddle cylinder 44 may be driven from one of the other cylinders or independently from another drive motor. It is usually desired to drive the discharge cylinder 44 at a higher rate than the others and this may be done through an independent drive, or by means of a change speed device when driven from another cylinder.

While FIGURE 4 shows the discharge paddle cylinder 44 substantially on the same level as the other cylinders 42, it is within the compass of the invention to arrange the discharge cylinder 44 at a higher position than the other cylinders, as shown in FIGURE 6. The purpose of this arrangement will be referred to hereinbelow.

In the normal operation of the apparatus, the raw materials to be mixed are introduced in the inlet end of the apparatus through the duct or hood 12. They fall onto the first paddle cylinder, or a succeeding one near it, and due to rotation of the paddle cylinders the materials are fed from each one to the next, until the mixture is discharged through the opening 16. In either direction of rotation of the paddles, the materials are fed along as noted but in a slightly different manner. The paddles may be rotated for example in an "overhead" direction, i.e., clockwise, as viewed in FIGURE 4, for performing an "overhead mix." The paddles at the top part of the cylinder tend to catch the materials therein and perform a centrifugal mixing operation, i.e., they tend to catch the materials in the air and carry them to the next paddle cylinder. The shape of the paddles is of significance in this respect, i.e., at certain speeds the concave side aids in catching the materials an in so doing, conveying them. This performs a floating action, i.e., substantial portions of the materials are carried along the top of the mix and are not brought down and around with the cylinder into the trough 60.

On the other hand when the paddle cylinders are rotated in the opposite direction, i.e., counter clock-wise as viewed in FIGURE 4, a "bottom mix" is performed—a greater portion of the materials are carried by the paddles down into the trough 60. In this direction of rotation, there is a greater mixing effect, i.e., there is more churning, etc., in the trough. In this connection also the shape of the paddle is of importance, i.e., the outer end segments of the paddles because of their trailing direction relative to the radial, tend to lift the materials or kick them out of the trough and over the caps 64 into the next trough. Where such an intense mixing operation is not required, the overhead mixing operation may be utilized. The abrasive action of the materials on the apparatus is not as great in the overhead mixing as in bottom mixing.

It will be appreciated that the paddle cylinders may be operated at any desired speeds within practical limits. A speed of 100 r.p.m. for the paddle cylinders 42 has been found satisfactory and it may be desired to rotate the discharge paddle cylinder 44 at a higher rate, such as 400 r.p.m. Obviously, the invention is not limited to any specific rate of speed. The speed of the rotation of the paddle cylinders may be varied according to different materials used, the intended capacity, etc., as well as other factors. There is no limit to the various combinations of materials that may be used and the proportion of the different materials may vary from one job to the next. It is impossible to predict the effect in any given mixing operation, but the present apparatus can be adapted to each operation encountered such as by varying the rate of speed or direction of rotation of the paddle cylinders, or any of them. For example in a group of four cylinders, it may be desired to have three of them rotate in overhead mixing direction, and the fourth in bottom mixing direction.

The apparatus is adapted to effectively operate in a horizontal position or it may be inclined downwardly and forwardly, as desired. In any case, the migration of the materials through the apparatus progresses somewhat in proportion to the speed at which the materials are introduced into the apparatus, i.e., as the materials tend to pile up at the inlet end they are shifted and fed to successive paddle cylinders. In the normal operation of the apparatus the top surface of the materials in the receptacle 32 slopes downwardly and forwardly toward the discharge end.

In the arrangement shown in FIGURE 4 in which the discharge paddle cylinder 44 is at substantially the same level as the other paddle cylinder, the mixed concrete leaving the last paddle cylinder 42 is fed onto the discharge paddle cylinder and the latter throws the material through the discharge opening 16. In the arrangement of FIGURE 6 wherein the discharge cylinder 44 is in a relatively elevated position the mixture leaving the adjacent paddle cylinder 42 moves against the discharge paddle cylinder at a position substantially below the axis of the latter. This arrangement enables a more effective discharge of the materials.

It is also within the scope of the invention to provide two smaller discharge cylinders 44 instead of one, an upper and a lower one, with the upper one positioned farther toward the outlet end of the device than the lower one. In such case, the mixed material passes between the two cylinders and is discharged downwardly toward the belt 18.

As an example of the large capacity of the apparatus, an apparatus having a width between the side plates 36 of approximately 2'6", and in which the paddle cylinders were substantially 16" in diameter and the cylinders 42 rotated at 100 r.p.m., as much as 2,000,000 pounds in end product, i.e., mixed wet concrete, was thoroughly mixed in an 8-hour period. Such concrete includes in the neighborhood of 5% water.

Where I have herein shown and described a certain preferred embodiment of the invention, it will be understood that changes may be made therein within the scope of the assigned claims.

I claim:

1. Mixing apparatus of the character disclosed comprising, in combination, a receptacle having an inlet end and a discharge end, a plurality of paddle cylinders rotatably mounted in the receptacle and arranged on axes transverse to the longitudinal direction of the receptacle, a cylindrical trough receiving the lower portion of each paddle cylinder, the paddle cylinders being closely adjacent each other and arranged in a linear series with their axes lying in a common plane parallel with the bottom of the receptacle, each paddle cylinder including a central shaft and a plurality of paddles extending generally radially therefrom, the paddles being arranged in a plurality of axial rows spaced circumferentially around the shaft, the paddles being spaced apart in axial direction in each row, and being staggered in succession from one row to the next circumferentially of the shaft.

2. The invention set out in claim 1 wherein the paddles have substantial dimension in axial direction and each paddle has such dimension greater than the space in between paddles, and the staggered relation of the paddles is such that the openings in each row are followed by paddles in successive rows.

3. The invention set out in claim 1 wherein the paddles have substantial dimension in axial direction and each paddle has such dimension greater than the space between the paddles, and the staggered relation of the paddles is such that the openings in each row are followed by paddles in successive rows, the paddles being bent on lines parallel with the axis of the paddle cylinder and each paddle including an inner portion extending substantially radially from the axis of the paddle cylinder and an outer portion bent at an angle to the inner portion.

4. The invention set out in claim 3 wherein the outer portions of the paddles are disposed at an angle of in the neighborhood of the 20° to the inner portions.

5. Mixing apparatus of the character disclosed comprising, in combination, a longitudinal receptacle having an inlet end and a discharge end, and a plurality of paddle cylinders rotatably mounted in the receptacle on axes transverse to the receptacle and closely adjacent each other with their axes of rotation lying in a common plane parallel with the bottom of the receptacle, the paddle cylinders each including a central shaft and a plurality of generally radially extending paddles, the paddles each being bent about a line parallel with the axis of the paddle cylinder and the paddle cylinders being arranged with concave sides of the paddles on the upper sides of the paddle cylinders facing toward the discharge end of the receptacle.

6. Apparatus of the character disclosed comprising, in combination, a generally longitudinal receptacle having an inlet end and a discharge end with a discharge opening in the discharge end, and a plurality of mixing members rotatably mounted in the receptacle on axes transverse to the longitudinal direction of the receptacle, said mixing members being disposed in a linear succession longitudinally of the receptacle with their axes lying in a common plane, and a discharge member rotatably mounted in the receptacle on a transverse axis adjacent said discharge opening, said mixing members being closely adjacent each other and each being operative for advancing mixed material to the next member, and the last of said members being operative for advancing mixed material to the discharge member, and the discharge member being operative for advancing mixed materials through said discharge opening, said mixing members being provided with paddles each of which is bent intermediate its ends on a line parallel with the axis of the paddle cylinder, and the discharge member being provided with a plurality of radially straight paddles.

7. The invention set out in claim 6 wherein driving means is provided for driving the mixing members all at substantially a predetermined rate of rotation, and for driving said discharge member at a rate different from that of the mixing members.

8. The invention set out in claim 6 wherein the discharge member is disposed substantially at the level of the mixing members.

9. The invention set out in claim 6 wherein the discharge member is disposed substantially higher than the mixing members.

10. Apparatus of the character disclosed comprising, in combination, a generally elongated receptacle having an inlet end and a discharge end, a plurality of paddle cylinders arranged in a plurality of groups, rotatably mounted in the receptacle on axes transverse to the longitudinal direction of the receptacle, said paddle cylinders being closely adjacent each other and arranged with their axes lying in a common plane, the paddle cylinders being operative for advancing mixed materials from one paddle cylinder to the next, and from the last of the paddle cylinders to the discharge end, and means for driving one group of the paddle cylinders in one direction, and other means for driving another group of paddle cylinders in an opposite direction.

11. The invention set out in claim 10 wherein drive means is provided for selectively driving various ones of the paddle cylinders in each of mutually reverse directions independently of the others.

12. Mixing apparatus of the character disclosed comprising, in combination, an elongated box like receptacle having a bottom and side wall elements, the receptacle having an inlet end with a vertical end wall thereat and having a discharge end with a discharge opening at the bottom thereof and an end wall longitudinally beyond the discharge opening, a plurality of mixing paddle cylinders rotatably mounted in the receptacle on axes transverse to the longitudinal direction thereof, each mixing paddle cylinder including a central shaft and a plurality of generally radially extending paddles distributed substantially fully throughout the length and circumference of the shaft, and the mixing paddle cylinders extending substantially fully across the interior of the receptacle between the side wall elements, being closely adjacent each other and arranged with their axes lying in a common horizontal plane, the receptacle including a transverse cylindrical trough for each mixing paddle cylinder receiving the lower portion of the paddle cylinder concentrically therein and being of a radius only slightly greater than that of the paddle cylinder, the apparatus also including a discharge paddle cylinder rotatably mounted on an axis transverse to the longitudinal direction of the receptacle and disposed generally over the discharge opening, the mixing paddle cylinders being operative for advancing mixed materials successively from one to the next, and the last thereof being operative for advancing the materials to the discharge paddle cylinder, the discharge paddle cylinder extending substantially the full dimension between the side wall elements of the receptacle and including a central cylinder and a plurality of generally radially extending paddles distributed throughout the length and circumference of the central shaft.

13. Mixing apparatus of the character disclosed comprising, in combination, a receptacle having an inlet end and a discharge end, and being open at the top at the inlet end and having a discharge opening at the bottom and at the discharge end, and a plurality of paddle cylinders rotatably mounted in the receptacle, the paddle cylinders each having a plurality of generally radially extending paddles, the paddle cylinders being arranged on axes transverse to the longitudinal direction of the receptacle and disposed closely adjacent each other in succession along the length of the receptacle from the inlet end to a point closely adjacent the discharge opening, said receptacle including a trough receiving the bottom portion of each paddle cylinder concentrically therein and of a radius slightly greater than that of the paddle cylinder, the adjacent troughs substantially joining at points at least as low as the axes of the paddle cylinders, said troughs being demountably secured in the receptacle, the troughs having projections on their exterior surfaces for engaging the bottom of the receptacle for stabilizing them, and a cap mounted on the adjacent edges of adjacent troughs and detachably secured in the receptacle.

References Cited by the Examiner

UNITED STATES PATENTS

| 1,091,749 | 3/1914 | Michels | 259—179 |
| 2,409,646 | 10/1946 | Seaman | 259—178 |

FOREIGN PATENTS

| 94,546 | 8/1959 | Norway. |

WALTER A. SCHEEL, *Primary Examiner.*

R. W. JENKINS, *Assistant Examiner.*